United States Patent
Wang et al.

(10) Patent No.: US 11,342,781 B2
(45) Date of Patent: May 24, 2022

(54) POWER MANAGEMENT CIRCUIT AND POWER MANAGEMENT METHOD FOR TRIBOELECTRIC NANOGENERATOR

(71) Applicant: BEIJING INSTITUTE OF NANOENERGY AND NANOSYSTEMS, Beijing (CN)

(72) Inventors: Zhonglin Wang, Beijing (CN); Gang Cheng, Beijing (CN)

(73) Assignee: BEIJING INSTITUTE OF NANOENERGY AND NANOSYSTEMS, Beijing (CN)

(*) Notice: Subject to any disclaimer, the term of this patent is extended or adjusted under 35 U.S.C. 154(b) by 347 days.

(21) Appl. No.: 16/499,598

(22) PCT Filed: Dec. 1, 2017

(86) PCT No.: PCT/CN2017/114253
§ 371 (c)(1),
(2) Date: Sep. 30, 2019

(87) PCT Pub. No.: WO2018/176893
PCT Pub. Date: Oct. 4, 2018

(65) Prior Publication Data
US 2021/0104906 A1 Apr. 8, 2021

(30) Foreign Application Priority Data

Apr. 1, 2017 (CN) .......................... 201710214174.4

(51) Int. Cl.
*H02J 7/32* (2006.01)
*H02N 1/04* (2006.01)
*H02N 1/08* (2006.01)

(52) U.S. Cl.
CPC .................. *H02J 7/32* (2013.01); *H02N 1/04* (2013.01); *H02N 1/08* (2013.01)

(58) Field of Classification Search
CPC ................ H02N 1/04; H02N 1/08; H02J 7/32
See application file for complete search history.

(56) References Cited

U.S. PATENT DOCUMENTS 6,407,483 B1 * 6/2002 Nunuparov ............. H02M 3/00
310/339
10,103,649 B2 * 10/2018 Rutgers ................... H02N 1/04
(Continued)

FOREIGN PATENT DOCUMENTS

CN        103368447 A     10/2013
CN        203377111 U      1/2014
(Continued)

OTHER PUBLICATIONS

English machine translation of Xu et al. (CN203377111), 1/14. (Year: 2014).*

(Continued)

*Primary Examiner* — Burton S Mullins
(74) *Attorney, Agent, or Firm* — Myers Bigel, PA (57) ABSTRACT

The present disclosure discloses a power management circuit and a power management method for a triboelectric nanogenerator. The power management circuit includes a pulse current control switch, an intermediate energy storage element, and a target energy storage element, wherein the pulse current control switch is configured to instantaneously connect two electrode layers of the triboelectric nanogenerator to generate a transient pulse current, after movement of two relative moving components of the triboelectric nanogenerator generates static charges induced between the two electrode layers; the intermediate energy storage element is configured to store electric energy of the transient pulse current, and the target energy storage element is configured to store the electric energy output from the intermediate energy storage element.

18 Claims, 7 Drawing Sheets

(56) References Cited

U.S. PATENT DOCUMENTS

| | | | | |
|---|---|---|---|---|
| 10,778,120 | B2* | 9/2020 | Niu | H02J 7/00 |
| 11,196,357 | B1* | 12/2021 | Matthews | H02J 7/0068 |
| 2013/0049531 | A1 | 2/2013 | Wang et al. | |
| 2016/0043626 | A1* | 2/2016 | Klyosov | H05B 3/44 |
| | | | | 363/132 |

FOREIGN PATENT DOCUMENTS

| | | | |
|---|---|---|---|
| CN | 103780132 | A | 5/2014 |
| CN | 103795288 | A | 5/2014 |
| CN | 104253561 | A | 12/2014 |
| CN | 104767376 | A | 7/2015 |
| CN | 205565902 | U | 9/2016 |
| CN | 105990908 | A | 10/2016 |
| DE | 102014204864 | A1 | 9/2015 |
| EP | 3010138 | A1 | 4/2016 |
| JP | 2015106929 | A | 6/2015 |
| JP | 2016526866 | A | 9/2016 |
| WO | 2015010419 | A1 | 1/2015 |
| WO | 2016096492 | A1 | 6/2016 |

OTHER PUBLICATIONS

English machine translation of Cheng et al. (WO 2015/010419), 1/15. (Year: 2015).*

International Search Report and Written Opinion of the International Searching Authority, International Application No. PCT/CN2017/114253, dated Mar. 1, 2018, 7 pp.

Qin et al., "High Energy Storage Efficiency Triboelectric Nanogenerators with Unidirectional Switches and Passive Power Management Circuits", Advanced Functional Materials, vol. 28, No. 51, Dec. 19, 2018, 10 pp.

"Communication with Supplementary European Search Report", EP Application No. 17902950.9, dated Dec. 11, 2020, 10 pp.

"First Office Action and English language translation", CN Application No. 201710214174.1, dated Mar. 21, 2019, 21 pp.

"Notice of Reasons for Refusal and English language translation", JP Application No. 2019-553431, dated Nov. 24, 2020, 12 pp.

"Notification of Reason for Refusal and English language translation", KR Application No. 10-2019-7031448, dated Dec. 24, 2020, 12 pp.

Cheng, Gang, et al., "Pulsed Nanogenerator with Huge Instantaneous Output Power Density", ACS NANO, vol. 7, No. 8, Aug. 27, 2013, pp. 7383-7391.

Meninger, Scott, et al., "Vibration-to-Electric Energy Conversion", IEEE Transactions on Very Large Scale Integration (VLSI) Systems, vol. No. 9, No. 1, Feb. 2001, pp. 64-76.

Niu, Simiao, et al., "A universal self-charging system driven by random biomechanical energy for sustainable operation of mobile electronics", Nature Communications, vol. 6, Dec. 11, 2015, 8 pp.

* cited by examiner

POWER MANAGEMENT CIRCUIT AND POWER MANAGEMENT METHOD FOR TRIBOELECTRIC NANOGENERATOR

CROSS REFERENCE OF APPLICATIONS

This disclosure claims the benefit of the Chinese patent application No. 201710214174.1, entitled "Power management circuit and power management method for triboelectric nanogenerator," filed on Apr. 1, 2017, and the PCT application No. PCT/CN2017/114253, entitled "Power management circuit and power management method for triboelectric nanogenerator," filed on Dec. 1, 2017, which is hereby incorporated herein by reference.

TECHNICAL FIELD

The present disclosure relates to the fields of converting mechanical energy into electric energy, and in particular, to a power management circuit and a power management method of a triboelectric nanogenerator for converting mechanical energy into electric energy.

BACKGROUND

Mechanical energy is a widespread form of energy, including waves, wind energy, kinetic energy of various moving objects, and human activities such as walking, running, and jumping. Although the mechanical energy is widely spread, it is often overlooked. There is no effective means of collection to use the mechanical energy, which is usually wasted.

At present, the principles utilized by generators that convert the mechanical energy into the electric energy mainly comprise electrostatic induction, electromagnetic induction and piezoelectric properties of special materials. However, the electrostatic induction generator that has been developed has disadvantages of a larger volume and narrow applicability, etc., and the electromagnetic induction generator and the piezoelectric generator generally have defects, such as a more complicated structure, special requirements on materials, and a higher cost. A triboelectric nanogenerator is a recently developed novel approach of converting the mechanical energy into the electric energy. However, the triboelectric nanogenerator has disadvantages of a smaller output current and a lower output power, and its energy storage efficiency is very low, which makes it difficult to be applied in practice.

SUMMARY

The present disclosure relates to a power management method of converting output of a triboelectric nanogenerator into a transient high-power electrical pulse by using a pulse current control switch, which can store the electrostatic energy generated by the triboelectric nanogenerator efficiently, and may provide continuous power supply for electronic devices.

For the above purpose, the present disclosure provides a power management circuit for a triboelectric nanogenerator, including: a pulse current control switch, an intermediate energy storage element, and a target energy storage element, wherein the pulse current control switch is configured to instantaneously connect two electrode layers of the triboelectric nanogenerator to generate a transient pulse current, after movement of two relative moving components of the triboelectric nanogenerator generates static charges induced between the two electrode layers;

the intermediate energy storage element is configured to store electric energy of the transient pulse current; and the target energy storage element is configured to store the electric energy output from the intermediate energy storage element.

Preferably, a position of the pulse current control switch is so arranged that when a potential difference between the two electrode layers is maximal, the pulse current control switch is closed.

Preferably, the power management circuit includes two of the pulse current control switches, each of which separately controls the two electrode layers to be connected instantaneously, wherein two ends of the intermediate energy storage element are inversely connected to the two electrode layers for the respective cases where the two pulse current control switches are closed respectively.

Preferably, the pulse current control switch is a contact-type switch, comprising two contacts and two contact terminals, wherein the contacts and the contact terminals are respectively arranged at the two relative moving components of the triboelectric nanogenerator, and the contacts and the contact terminals move relative to each other in synchronization with relative movement of the triboelectric nanogenerator, and wherein the two contacts are connected to the intermediate energy storage element, the two contact terminals are respectively connected to the two electrode layers, and the contact-type switch is closed when the two contacts are contacted with the two contact terminals.

Preferably, the power management circuit includes two of the contact-type switches, wherein the two contact-type switches share the two contacts.

Preferably, the intermediate energy storage element is an inductive element.

Preferably, an inductance of the inductive element ranges between 1 µH and 100 H, preferably between 1 mH and 50 H, and more preferably between 100 mH and 20 H.

Preferably, the target energy storage element is a capacitive element.

Preferably, the capacitive element is connected to a diode in series, and then the capacitive element and the diode are connected in parallel with the intermediate energy storage element.

Preferably, a capacitance of the capacitive element ranges between 1 pF and 100 mF, preferably between 100 pF and 50 mF, and more preferably between 500 pF and 20 mF.

Preferably, the triboelectric nanogenerator includes the two electrode layers, and a basic motion mode of the two relative moving components is one of: a Vertical Contact Separation (CS) mode, a Lateral Sliding (LS) mode, a Single Electrode Contact (SEC) structure, a Sliding Freestanding Triboelectric-layer (SFT) structure or a Contacted Freestanding Triboelectric-layer (CFT) structure.

Accordingly, the present disclosure further provides a power management method for a triboelectric nanogenerator, including:

generating, by movement of two relative moving components of the triboelectric nanogenerator, static charges induced between two electrode layers of the triboelectric nanogenerator;

connecting the two electrode layers to generate a transient pulse current, and storing electric energy of the transient pulse current in an intermediate energy storage element; and transferring the electric energy in the intermediate energy storage element to a target energy storage element.

Preferably, connecting the two electrode layers to generate the transient pulse current includes setting a pulse current control switch at the two relative moving components of the triboelectric nanogenerator.

Preferably, the electric energy of the transient pulse current is stored in an inductive element.

Preferably, the electric energy in the inductive element is transferred to a capacitive element, and a diode is provided to control a direction of the current.

Compared to the conventional technical solutions, the present disclosure has beneficial effects as follows.

1. By using an element with an inductive reactance characteristic, such as an inductor, as an intermediary for energy storage, the storage efficiency of storing the energy from the triboelectric nanogenerator to the energy storage element, such as a capacitor, a battery, could be improved;

2. The energy conversion and storage process is triggered by a mechanical switch, which avoids the introduction of a complicated switch control circuit, reduces the use cost, and increases the application range and flexibility;

3. In the case of using the same triboelectric nanogenerator, the provision of the pulse current control switch may significantly improve the output current and the output power, and expand the application of the triboelectric nanogenerator in terms of the high current and the high power.

BRIEF DESCRIPTION OF THE DRAWINGS

The above and other objects, features and advantages of the present disclosure will become more apparent from the drawings. The same reference numbers are used throughout the drawings to refer to the same parts. The drawings are not scaled in an actual size, but intended to show the subject matters of the present disclosure.

DETAILED DESCRIPTION

The technical solutions in the embodiments of the present disclosure will be clearly and completely described below in conjunction with the drawings in the embodiments of the present disclosure. It is apparent that the described embodiments are only parts, but not all, of the embodiments of the present disclosure. All other embodiments obtained by the skilled in the art based on the embodiments in the present disclosure without creative efforts are within the scope of the present disclosure.

In addition, the present disclosure will be described in detail in conjunction with the drawings. When the embodiments of the present disclosure are described, the drawings are only examples for facilitating the illustration, which should not limit the scope of the present disclosure.

Figure 1:
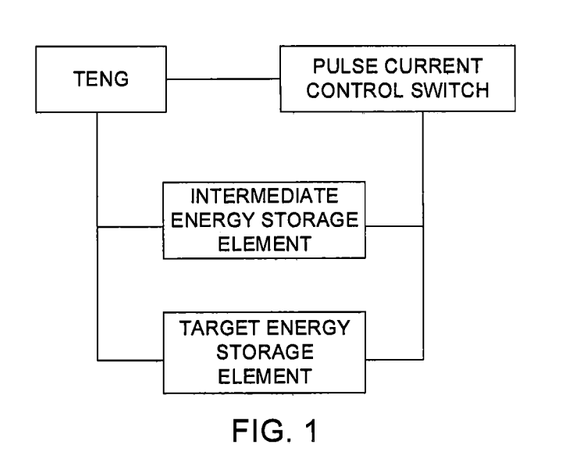
FIG. 1 is a schematic structural diagram of a power management circuit of a triboelectric nanogenerator provided by the present disclosure.

As shown in FIG. 1, a typical structure of a power management circuit of a triboelectric nanogenerator provided by the present disclosure includes a pulse current control switch, an intermediate energy storage element and a target energy storage element. The pulse current control switch is configured to instantaneously connect two electrode layers of the triboelectric nanogenerator to generate a transient pulse current, after movement of two relative moving components of the triboelectric nanogenerator generates static charges induced between the two electrode layers; the intermediate energy storage element is configured to store electric energy of the transient pulse current; and the target energy storage element is configured to store the electric energy output from the intermediate energy storage element.

The movement of the two relative moving components of the triboelectric nanogenerator itself causes the pulse current control switch to generate two states of "Open" and "Close" for controlling the generation of the current, so that a transient electrical pulse with a larger current and a higher power is generated between the two electrode layers when the pulse current control switch is closed.

In the power management circuit of the present disclosure, the provision of the pulse current control switch may overcome the shortcoming of the triboelectric nanogenerator having a smaller output current, output a large transient pulse current, and improve the transient output power. The energy of the large pulse current is transferred to the target energy storage element with a charge storage capability via the intermediate energy storage element with an inductive reactance characteristic. Efficient energy storage of the triboelectric nanogenerator is implemented by introducing the element with the inductive reactance characteristic as an intermediary for the energy conversion and storage process.

The existing triboelectric nanogenerator' structures are applicable to the power management circuit of the triboelectric nanogenerator provided by the present disclosure. Here, five types of basic structures or motion modes are listed, as shown in FIGS. 2a-2e.

The five types of basic structures are a Vertical Contact Separation (CS) mode, a Lateral Sliding (LS) mode, a Single Electrode Contact (SEC) structure, a Sliding Freestanding Triboelectric-layer (SFT) structure, and a Contacted Freestanding Triboelectric-layer (CFT) structure. The typical structure of each type of the triboelectric nanogenerator will be specifically described below with reference to the accompanying drawings.

Figure 2A:
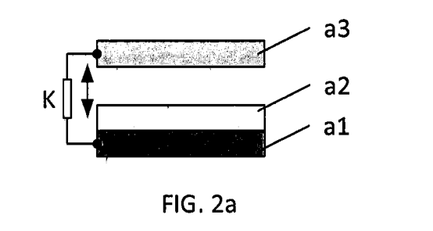
FIGS. 2a-2e are schematic structural views of basic motion modes of triboelectric nanogenerators.

The structure of the triboelectric nanogenerator in the Vertical Contact Separation (CS) mode is shown in FIG. 2a. In the two relative moving components, the first component includes a triboelectric layer a2 and a first electrode layer a1 arranged on the triboelectric layer a2, and the second component includes a second electrode layer a3. When the first component and the second component move relative to each other by vertically contacting with and separating from each other, the second electrode layer a3, also acting as another triboelectric layer, is contacted with the triboelectric layer a2 and separated from the triboelectric layer a2. The triboelectric layer a2 is made of a material different from that of the second electrode layer a3. The first electrode layer a1 and the second electrode layer a3 are connected to the pulse current control switch K. When the mutual separation of the triboelectric layer a2 and the second electrode layer a3 results in a maximal potential difference (amount of charges) between the first electrode layer a1 and the second electrode layer a3, the pulse current control switch K is closed, and the transient pulse current is output between the first electrode layer a1 and the second electrode layer a3 to the intermediate energy storage element.

Figure 2B:
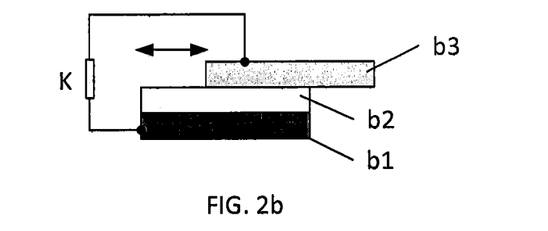

The structure of the triboelectric nanogenerator in the Lateral Sliding (LS) mode is shown in FIG. 2b. In the two relative moving components, the first component includes a triboelectric layer b2 and a first electrode layer b1 arranged on the triboelectric layer b2, and the second component includes a second electrode layer b3. When the first component and the second component laterally slide relative to each other, the second electrode layer b3, also acting as another triboelectric layer, performs mutual sliding friction with the triboelectric layer b2. The triboelectric layer b2 is made of a material different from that of the second electrode layer b3. The first electrode layer b1 and the second electrode layer b3 are output terminals of the triboelectric nanogenerator and connected to the pulse current control switch K. When the mutual sliding friction and malposition between the triboelectric layer b2 and the second electrode layer b3 results in a maximal potential difference (amount of charges) between the first electrode layer b1 and the second electrode layer b3, the pulse current control switch K is closed, and the transient pulse current is output between the first electrode layer b1 and the second electrode layer b3 to the intermediate energy storage element.

Figure 2C:
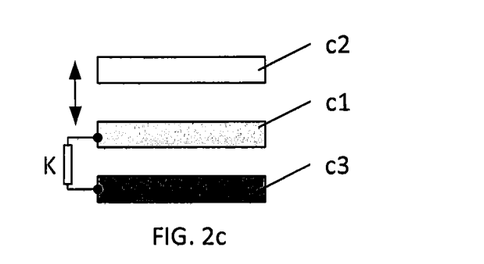

The structure of the triboelectric nanogenerator in the Single Electrode Contact (SEC) structure is shown in FIG. 2c. In the two relatively moving components, the first component includes a triboelectric layer c2, and the second component includes a first electrode layer c1 and a second electrode layer or an equipotential c3. The triboelectric layer c2 and the first electrode layer c1 of the second component move relative to each other by vertically contacting with and separating from each other, or sliding relative to each other. The triboelectric layer c2 is made of a material different from that of the first electrode layer c1. The first electrode layer c1 and the second electrode layer c3 are output terminals of the triboelectric nanogenerator and connected to the pulse current control switch K. When the mutual sliding friction and malposition between the triboelectric layer c2 and the second electrode layer c3 results in a maximal potential difference (amount of charges) between the first electrode layer c1 and the second electrode layer c3, the pulse current control switch K is closed, and the transient pulse current is output between the first electrode layer c1 and the second electrode layer c3 to the intermediate energy storage element.

Figure 2D:
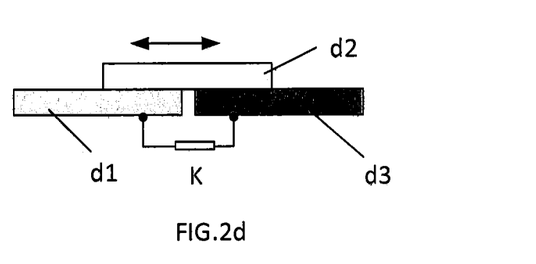

The structure of the triboelectric nanogenerator in the Sliding Freestanding Triboelectric-layer (SFT) structure is shown in FIG. 2d. In the two relative moving components, the first component includes a triboelectric layer d2, and the second component includes a first electrode layer d1 and a second electrode layer d3 separated from each other. When the first component and the second component slide relative to each other, the triboelectric layer d2 slides from the first electrode layer d1 to the second electrode layer d3, and the first electrode layer d1 and the second electrode layer d3 act as another triboelectric layer. The triboelectric layer d2 is made of a material different from those of the first electrode layer d1 and the second electrode layer d3. The first electrode layer d1 and the second electrode layer d3 are connected to the pulse current control switch K. When the triboelectric layer d2 slides between the first electrode layer d1 and the second electrode layer d3, resulting in a maximal potential difference (amount of charges) between the first electrode layer d1 and the second electrode layer d3, the pulse current control switch K is closed, and the transient pulse current is output between the first electrode layer d1 and the second electrode layer d3 to the intermediate energy storage element.

Figure 2E:
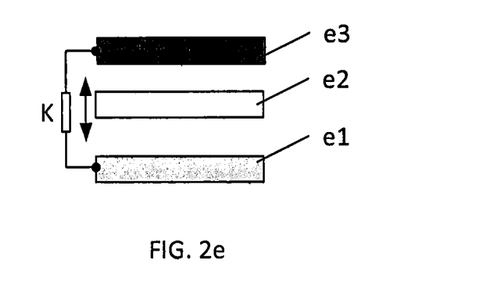

The structure of the triboelectric nanogenerator in the Contacted Freestanding Triboelectric-layer (CFT) structure is shown in FIG. 2e. In the two relative moving components, the first component includes a triboelectric layer e2, and the second component includes a first electrode layer e1 and a second electrode layer e3 separated from each other. The triboelectric layer e2 is arranged between the first electrode layer e1 and the second electrode layer e3. The triboelectric layer e2 moves between the two electrode layers to be contacted with the two electrode layers respectively and separated from the two electrode layers respectively. The first electrode layer e1 or the second electrode layer e3 acts as another triboelectric layer. The triboelectric layer e2 is made of a material different from those of the first electrode layer e1 and the second electrode layer e3. The first electrode layer e1 and the second electrode layer e3 are connected to the pulse current control switch K. When the triboelectric layer e2 moves between the two electrode layers to be contacted with the two electrode layers respectively and separated from the two electrode layers respectively, resulting in a maximal potential difference (amount of charges) between the first electrode layer e1 and the second electrode layer e3, the pulse current control switch K is closed, and the transient pulse current is output between the first electrode layer e1 and the second electrode layer e3 to the intermediate energy storage element.

Both the triboelectric nanogenerator in the Sliding Freestanding Triboelectric-layer (SFT) structure and the triboelectric nanogenerator in the Contacted Freestanding Triboelectric-layer (CFT) structure are triboelectric nanogenerators in the freestanding triboelectric-layer mode. The four types of operation modes of the triboelectric nanogenerator have been developed and the respective types have different structure designs and material selections to be adapted to the corresponding mechanical triggering conditions.

All of the five structures of the triboelectric nanogenerator as shown in FIGS. 2a-2e may be combined with the pulse current control switch to generate the transient pulse current. Hereinafter, the power management circuit and the power management method of the triboelectric nanogenerator will be explained by taking the triboelectric nanogenerator in the Sliding Freestanding Triboelectric-layer (SFT) structure as an example. The triboelectric nanogenerators in other four types of structures may refer to the example.

In the present embodiment, the pulse current control switch uses a contact-type switch, the intermediate energy storage element uses an inductive element, and the target energy storage element uses a capacitive element. Other switches and inductive elements may be used in other embodiments as long as the same functions can be implemented, which should not be construed as limiting the scope of the present disclosure. The capacitive element may be a commonly used electric energy storage element, such as a capacitor or a battery.

Figure 3:
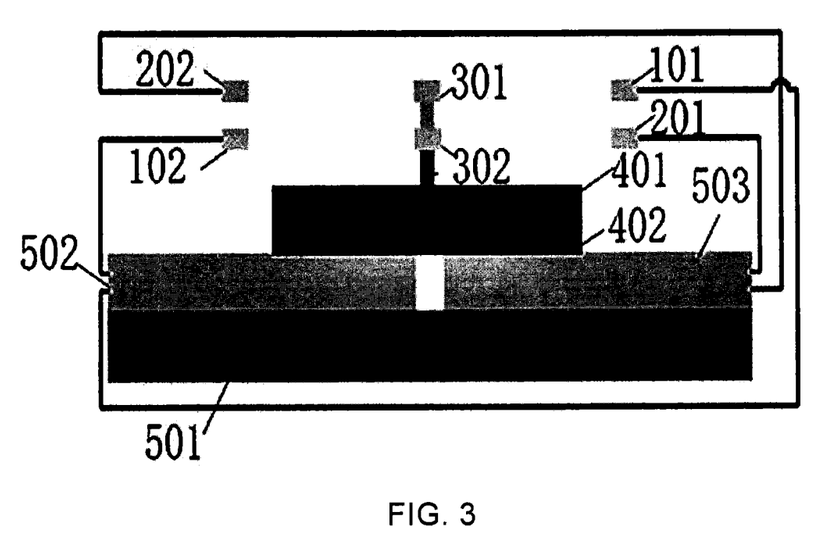
FIGS. 3-7 are schematic structural views of an embodiment of a triboelectric nanogenerator and a contact-type switch.

FIG. 3 is a typical structure of a triboelectric nanogenerator TENG in a Sliding Freestanding Triboelectric-layer (SFT) structure, which includes a first substrate 401, a first triboelectric layer 402 arranged on the lower surface of the first substrate 401; a second substrate 501, a first and a second electrode layers 502, 503 acting as the triboelectric layer arranged on the upper surface of the second substrate; two contact-type switches, the first contact-type switch including contact terminals 101, 201 and two contacts 301, 302, the second contact-type switch including contact terminals 102, 202 and two contacts 301, 302, the two contacts 301, 302 being shared by the two switches; wherein the two contacts 301, 302 are connected to the upper surface of the first substrate and may move along with the first substrate 401, the contact terminals 101, 102 are both connected to the first electrode layer 502, and the contact terminals 201, 202 are both connected to the second electrode layer 503; when the contacts 301, 302 are contacted with the contact terminals 101, 201 or with the contact terminals 102, 202, the contact-type switch is closed; when the contact-type switch is closed, there is a transient electrical signal output through the first electrode layer 502, the contact terminal 101 (or 102), the contacts 301, 302, and the second electrode layer 503 and the contact terminal 201 (or 202).

In the present disclosure, there may be various ways for the two contact terminals 101, 201 and 102, 202 of the two contact-type switches to be fixed in the triboelectric nanogenerator, which are not particularly limited herein, as long as the distance between the two contact terminals may enable the contacts 301, 302 to be contacted with the two contact terminals respectively. There may be various options for structure of the contact-type switch. The contact may be a contact piece or a striker, and the contact terminal may be a contact piece or a contact point. The material of the contacts 301, 302 or the two contact terminals 101, 201 (and 102, 202) may be selected from a metal or an alloy; the metal may be selected from gold, silver, platinum, aluminum, nickel, copper, titanium, chromium or selenium; and the alloy may be selected from an alloy or a stainless steel made of gold, silver, platinum, aluminum, nickel, copper, titanium, chromium or selenium.

Figure 4:
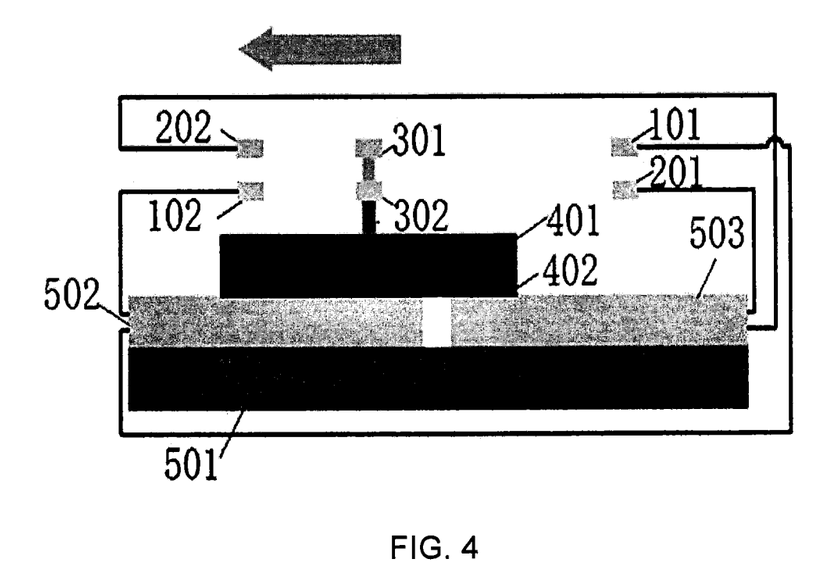
Figure 5:
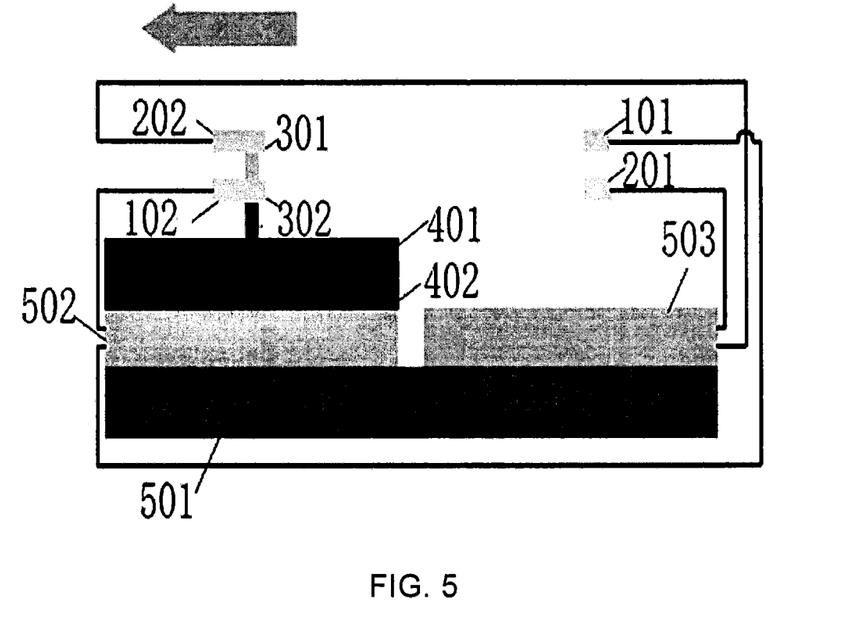
Figure 6:
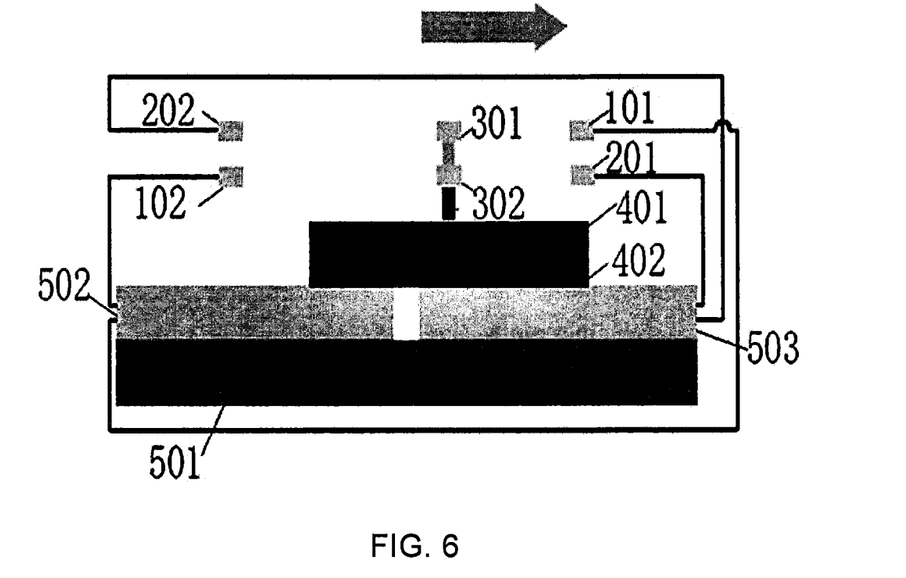
Figure 7:
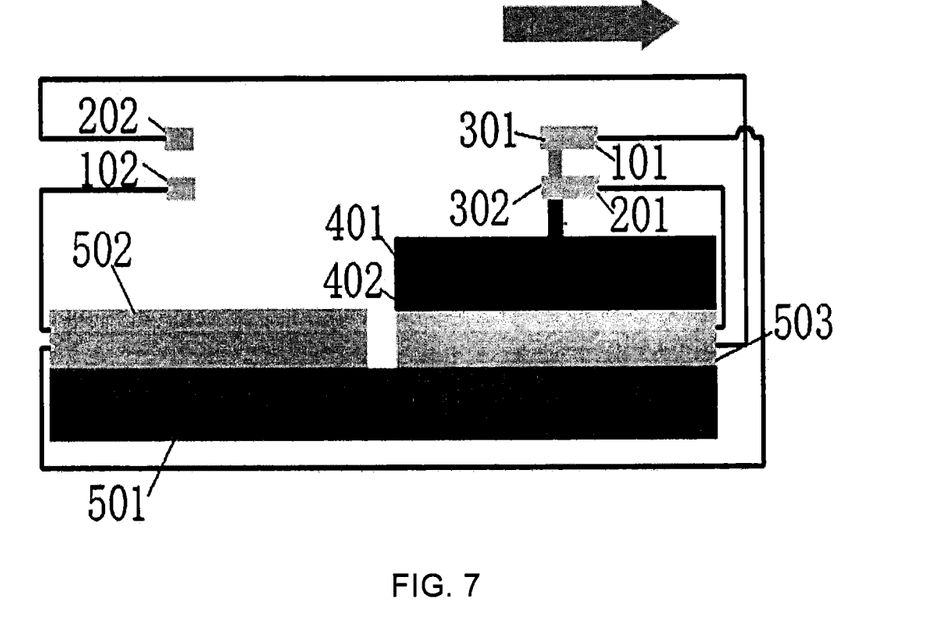
Figure 8:
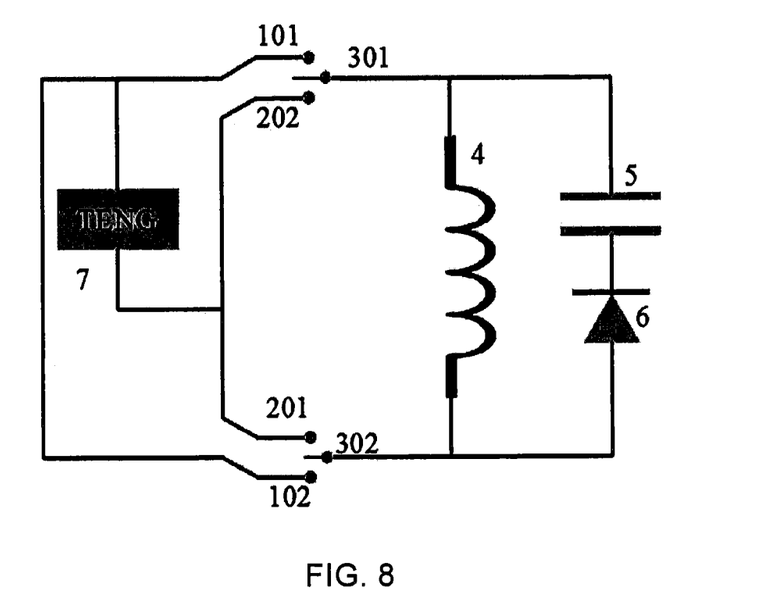
FIGS. 8-12 are schematic circuit structural diagrams in which a triboelectric nanogenerator is applied to a power management circuit.

The contact and the first substrate are connected by an insulating material. The insulating material may be organic glass, and is bonded by hot melt adhesive between the contact and the first substrate. When a lateral external force is applied on the first substrate 401, the first substrate moves laterally, causing the lower surface of the first triboelectric layer 402 to slide on the upper surface of the second triboelectric layers 502, 503. When the first substrate is in a nature state where no external force is applied, as shown in FIG. 3, the contacts 301, 302 are in the middle position of the second triboelectric layer in the natural state. Under the external force, the first substrate slides to one side relative to the second substrate 501 to enable the contacts 301, 302 and the contact terminals 102, 202 to be contacted with each other (forming the state as shown in FIG. 5). At this time, the contact-type switch is closed, the first electrode layer 502 is in connection with the second electrode layer 503, and the intermediate energy storage element is connected thereto. When the first substrate slides to the other side relative to the second substrate to enable the contacts 301, 302 and the contact terminals 101, 201 to be contacted with each other (forming the state as shown in FIG. 7), the contact-type switch is closed at this time, the first electrode layer 502 is in connection with the second electrode layer 503 again. During the sliding process of the first substrate, the contacts 301, 302 are not in contact with any of the two contact terminals (the first contact terminals 101, 201 or the second contact terminals 102, 202), so that the first electrode layer 502 and the second electrode layer 503 are disconnected. At this time, the triboelectric nanogenerator is in an open state, as shown in FIGS. 4 and 6. When the first substrate slides, the movable distance of the contacts 301, 302 is not smaller than a set distance between the contact terminals 101, 201 and 102, 202 of the two switches. Preferably, the position of the contact-type switch is so arranged that the contact-type switch is closed when the potential difference (amount of accumulated charges) between the two electrode layers is maximal. At this time, the movable distance of the contacts 301, 302 is equal to the set distance between the contact terminals 101, 201 and 102, 202. That is, when the lower surface of the first substrate and the upper surface of the second substrate are contacted and aligned with each other at the right side, the contacts 301, 302 are in contact with the contact terminals 101, 201 of the first switch; when the lower surface of the first substrate and the upper surface of the second substrate are contacted with and aligned with each other at the left side, the contacts 301, 302 are in contact with the contact terminals 102, 202 of the second switch. The set distance between the contact terminals of the two switches may be 50 mm to 200 mm. A load (an intermediate energy storage element, such as an inductive element) needed to be supplied with power is connected between the first electrode layer 502 of the triboelectric nanogenerator and the contact-type switch (or between the second electrode layer 503 and the contact-type switch) as an output of the triboelectric nanogenerator, constituting the power management circuit of the present disclosure, as shown in FIG. 8. In the reciprocating motion of the two parts of the triboelectric nanogenerator, the electrical output of the triboelectric nanogenerator is controlled by the contact-type switch. When the contact-type switch is opened, the triboelectric nanogenerator is in an open state, and no current is generated on the load; and when the contact-type switch is closed, the triboelectric nanogenerator is in a closed state, and generates a transient high-power output.

Figure 9:
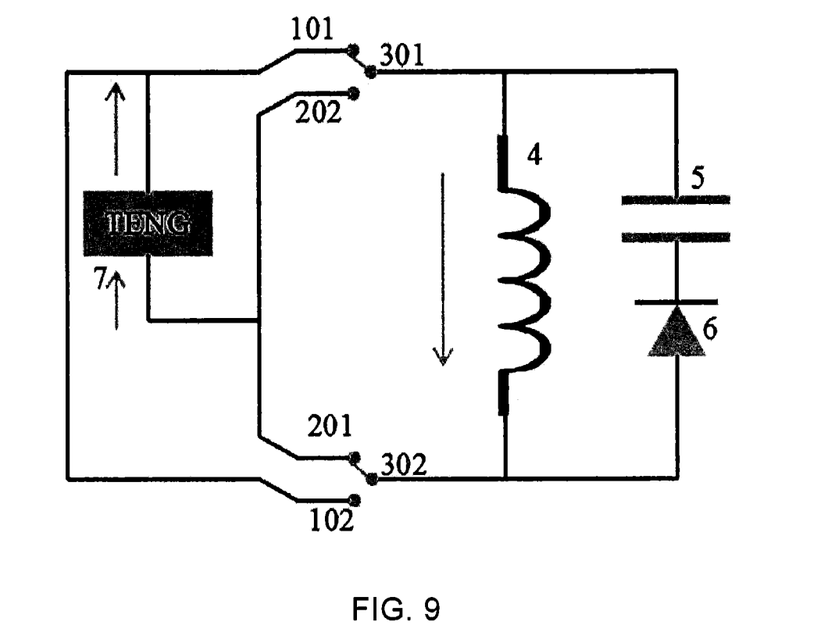
Figure 10:
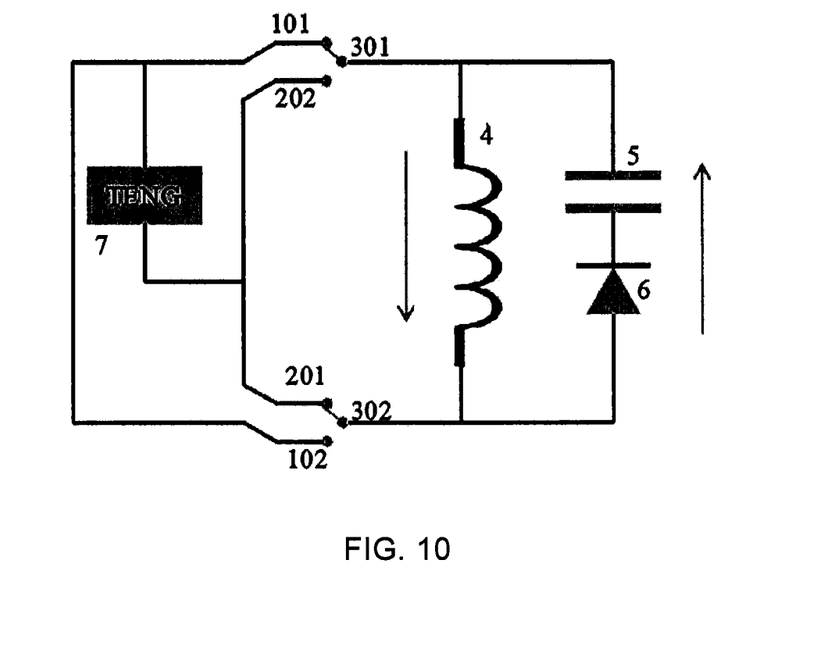
Figure 11:
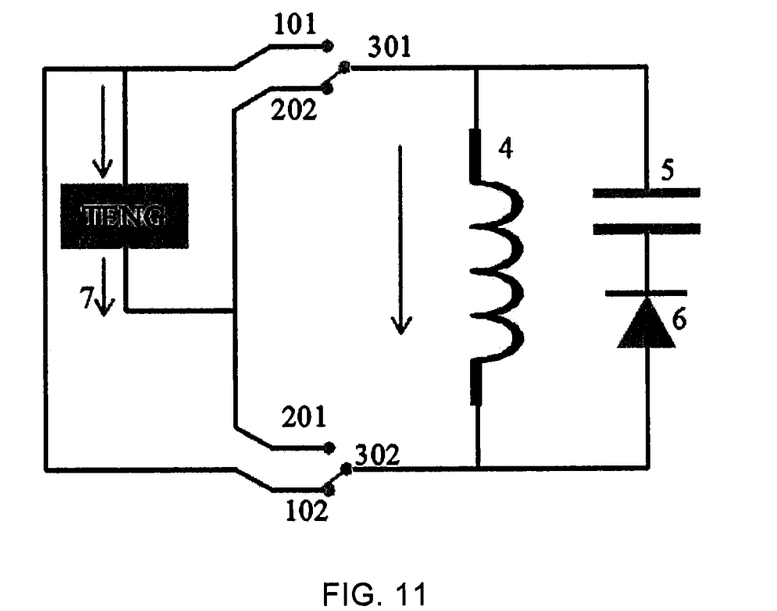
Figure 12:
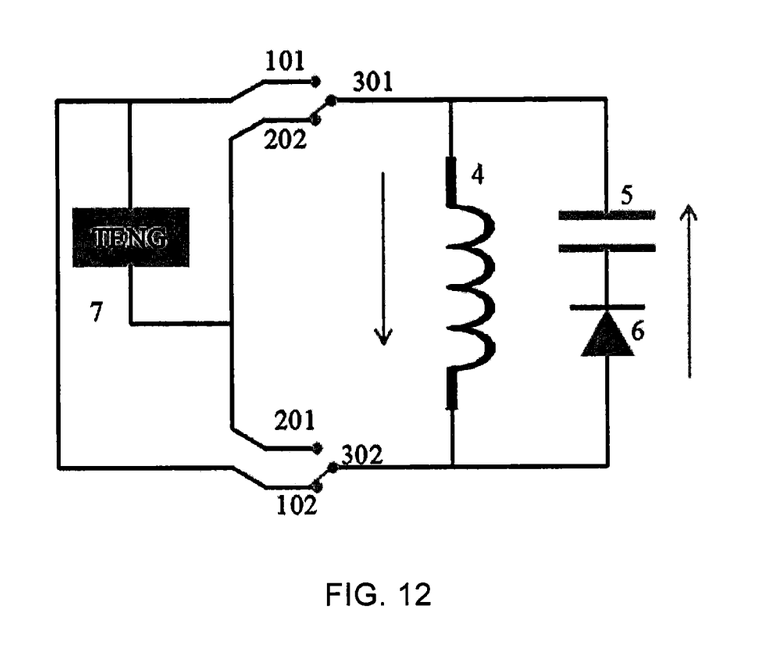

In the above power management circuit, when the contacts are in the natural state, the circuit is in the open state, as shown in FIG. 8; and when the contacts are in contact with the contact terminals of the switch on one side, as shown in FIG. 9, the contact 301 is connected to the contact terminal 101 and the contact 302 is connected to the contact terminal 201 simultaneously, a transient output with a large current and a high power is generated, and meanwhile due to the presence of the inductive element 4, even if the contact-type switch is opened thereafter, the energy stored in the inductive element 4 may be released slowly, and the capacitor 5 is continuously charged via the diode 6, as shown in FIG. 10; when the contact 301 is connected to the contact terminal 202 and the contact 302 is connected to the contact terminal 102 simultaneously, as shown in FIG. 11, the same transient output with a large current and a high power is generated as in the above process; similarly, the energy stored in the inductive element may be released slowly, and the capacitor 5 is continuously charged via the diode 6, as shown in FIG. 12.

Each contact-type switch of the two contact-type switches individually controls the two electrode layers 502 and 503 of the triboelectric nanogenerator 7 to be connected instantaneously. Two ends of the intermediate energy storage element (the inductive element 4) are inversely connected to the two electrode layers 502 and 503 for the respective cases where the two contact-type switches are closed respectively, in order to ensure that the directions of the current generated in the inductive element are the same. The arrows in FIGS. 9 to 12 indicate the direction of the current.

In the triboelectric nanogenerator of the present disclosure, the first triboelectric layer 402 and the second triboelectric layers 502, 503 need to satisfy that there is a triboelectric electrode sequence difference between the material of the triboelectric layer 402 and that of the second triboelectric layers 502, 503.

The material of the first triboelectric layer 402 may be an insulating material or a semiconductor material, e.g., a conventional high molecular polymer, such as polytetrafluoroethylene, polydimethylsiloxane, gallium arsenide, gallium phosphide or the like. The second triboelectric layers 502, 503, i.e., the two electrode layers, may use a common conductive material, such as the metal conductive material, like gold, silver, platinum, ITO, etc.

In the present disclosure, the first substrate and the second substrate are components for providing support for the first triboelectric layer and the first and the second electrode layers. There is no special requirement on the selection of the material of the first substrate, which may be a conductor, an insulator or a semiconductor, such as an aluminum plate or a silicon wafer. The material of the second substrate is required to be an insulator. The first substrate and the second substrate may be flexible substrates or rigid substrates, such as rubber or glass plates.

There is no special requirement on the selection of the material of the first substrate 401, the second substrate 501 and the switch bracket which are only for supporting and fixing. The insulating material is preferred, and the material may be selected from the insulating materials, such as glass, plexiglass, polyethylene sheet or polyvinyl chloride.

The power management circuit of the triboelectric nanogenerator provided in the present disclosure has a simpler structure, a simpler preparation method, and no special requirement on materials. In actual applications, it may be applied to collect ocean waves, wind energy, machinery and mechanical energy generated by motions of a human body by simply fixing and encapsulation, which has a wide range of practical uses.

The inductance L of the inductive element may range between 1 μH and 100 H, preferably between 1 mH and 50 H, and more preferably between 100 mH and 20 H. The capacitance C of the capacitive element may range between 1 μF and 100 mF, preferably between 100 μF and 50 mF, and more preferably between 500 μF and 20 mF.

In the present disclosure, both the contact and the contact terminal of the contact-type switch are contact pieces. When the contact piece of the contact is contacted with the contact piece of the contact terminal, the contact-type switch is closed. The contact between the two contact pieces has a larger contact area, which may reduce the contact resistance of the contact-type switch, and is suitable for a large current output. Referring to the triboelectric nanogenerator of FIG. 3, the contacts 301, 302 of the contact-type switch are contact pieces, and the contact terminals 101, 201 and 102, 202 of the two switches are contact pieces and fixed on the switch bracket. When the contacts are contacted with the contact terminals of any of the switches, the contact-type switch is closed, and the first electrode layer 502 is in connection with the second electrode layer 503; when the contact pieces 301, 302 are not in contact with any contact piece of the contact terminals 101, 201 of the first switch and the contact terminals 102, 202 of the second switch, the first electrode layer 502 and the second electrode layer 503 are disconnected.

The contact-type switch may also utilize the solution of a contact piece being in contact with a contact point. In this case, the two contact terminals in the above example become contact points, and other materials and structures are the same as those in the above example. Thus, the description thereof will not be repeated here. The contact-type switch with a striker or a contact point being in contact with a contact piece may achieve a stable contact in a shorter time and increase the speed of the contact-type switch, which is suitable for a high frequency output. Preferably, the contact piece of the contact-type switch has elasticity. When a contact piece is contacted with another contact piece (or a striker, a contact point, etc.), the contact piece is elastically deformed to ensure good electrical contact between the contact and the contact terminal.

Accordingly, the present disclosure also provides a power management method for a triboelectric nanogenerator, including:

generating, by movement of two relative moving components of the triboelectric nanogenerator, static charges induced between two electrode layers of the triboelectric nanogenerator;

connecting the two electrode layers to generate a transient pulse current, and storing electric energy of the transient pulse current in an intermediate energy storage element; and transferring the electric energy in the intermediate energy storage element to a target energy storage element.

By setting a pulse current control switch, such as a contact-type switch, at the two relative moving components of the triboelectric nanogenerator, the two electrode layers may be connected to generate a transient pulse current.

In an embodiment of the present disclosure, the electric energy of the transient pulse current is stored in an inductive element.

In an embodiment of the present disclosure, the electric energy in the inductive element may be transferred to the capacitive element through a diode. Referring to FIG. 8, the capacitive element 5 is connected to the diode 6, and then the capacitive element 5 and the diode 6 are connected in parallel with the intermediate energy storage element.

Hereinafter, a practical example is taken as an example to illustrate a preparation process of a triboelectric nanogenerator and an energy storage efficiency test result thereof.

First, the first substrate 401, the second substrate 501 and the switch bracket made of plexiglass are processed by laser cutting. A PTFE (Teflon) film is adhered to the lower surface of the first substrate 401 as the first triboelectric layer 402; then an Au film with a thickness of 100 nm is vapor deposited on the upper surface of the second substrate 501 by magnetron sputtering as the first electrode layer 502 and the second electrode layer 503. The two electrode layers are separated by a gap therebetween, and act as the second triboelectric layer. Cutting six Cu pieces as two contacts and four contact terminals of two contact-type switches, fixing two Cu pieces as the contacts 301 and 302 on the first substrate, and fixing the other four Cu pieces on the switch bracket according to the set distance as the two contact terminals. Two Cu pieces, as the contact pieces 101, 102, are connected to the first electrode layer through a conducting wire, and the other two Cu pieces, as the contact pieces 201, 202, are connected to the second electrode layer through a conducting wire. The first substrate, the second substrate and the switch bracket are connected and assembled according to the structure shown in FIG. 3. When there is no external contact applied, the intermediate contacts are placed at the middle position of the second substrate, and the layer of PTFE film may slide on the electrode layer when an external force is applied on the first substrate. An inductor (20 H) and a capacitor (33 μC) may be connected according to the structure in FIG. 8.

Figure 13:
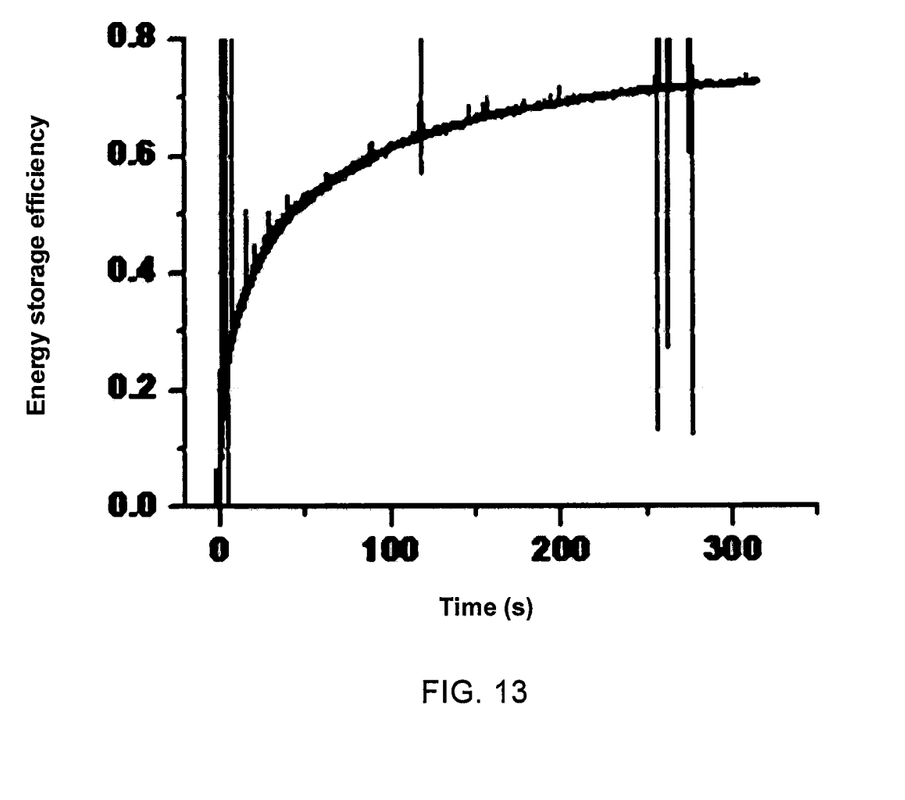
FIG. 13 is a graph of the energy storage efficiency over time in a particular power management circuit.

FIG. 13 is a graph of the energy storage efficiency over time (s) for a prepared triboelectric nanogenerator in a power management circuit. With the time lapses, the energy storage efficiency gradually increases to a flat level. The total energy storage efficiency is up to 40% when the voltage is charged to 10V; the total energy storage efficiency is up to 60% when the voltage is charged to 24V; the total energy storage efficiency is up to 70% when the voltage is charged to 41V; and the differential energy storage efficiency increases with the increase of the voltage, and is up to 79% when the voltage is higher than 22V.

The above description is only preferred embodiments of the present disclosure, and is not intended to limit the present disclosure in any way. Any person skilled in the art can make various possible variations and modifications to the technical solutions of the present disclosure by using the methods and technical contents as disclosed above or modify them to the equivalent embodiments thereof without departing from the scope of the present disclosure. Therefore, any simple modifications, equivalent variations and modifications of the above embodiments made without departing from the scope of the present disclosure fall into the protection scope of the present disclosure.

We claim:

1. A power management circuit for a triboelectric nanogenerator, comprising:
   a pulse current control switch;
   an intermediate energy storage element; and
   a target energy storage element,
   wherein the pulse current control switch is configured to instantaneously connect two electrode layers of the triboelectric nanogenerator to generate a transient pulse current, after movement of two relative moving components of the triboelectric nanogenerator generates static charges induced between the two electrode layers,
   wherein the intermediate energy storage element is configured to store electric energy of the transient pulse current,
   wherein the target energy storage element is configured to store the electric energy output from the intermediate energy storage element,
   wherein the pulse current control switch comprises two pulse current control switches, each of which separately controls a respective one of the two electrode layers to be connected instantaneously, and
   wherein two ends of the intermediate energy storage element are inversely connected to the two electrode layers when respective ones of the two pulse current control switches are closed respectively.

2. The power management circuit of claim 1, wherein a position of the pulse current control switch is arranged such that the pulse current control switch is closed when a potential difference between the two electrode layers is maximal.

3. The power management circuit of claim 1,
   wherein the pulse current control switch comprises a contact-type switch, comprising two contacts and two contact terminals,
   wherein the two contacts and the two contact terminals are respectively arranged at the two relative moving components of the triboelectric nanogenerator, and the two contacts and the two contact terminals move relative to each other in synchronization with relative movement of the triboelectric nanogenerator, and
   wherein the two contacts are connected to the intermediate energy storage element, the two contact terminals are respectively connected to the two electrode layers, and the contact-type switch is closed when the two contacts are contacted with the two contact terminals.

4. The power management circuit of claim 3,
   wherein the contact-type switch comprises two contact-type switches, and
   wherein the two contact-type switches share the two contacts.

5. The power management circuit of claim 1, wherein the intermediate energy storage element comprises an inductive element.

6. The power management circuit of claim 5, wherein an inductance of the inductive element ranges between 1μH and 100 H.

7. The power management circuit of claim 1, wherein the target energy storage element comprises a capacitive element.

8. The power management circuit of claim 7,
   wherein the capacitive element is connected to a diode in series, and
   wherein the capacitive element and the diode are connected in parallel with the intermediate energy storage element.

9. The power management circuit of claim 7, wherein a capacitance of the capacitive element ranges between 1 μF and 100 mF.

10. The power management circuit of claim 1,
    wherein the triboelectric nanogenerator comprises the two electrode layers, and
    wherein a basic motion mode of the two relative moving components is one of a Vertical Contact Separation (CS) mode, a Lateral Sliding (LS) mode, a Single Electrode Contact (SEC) structure, a Sliding Freestanding Triboelectric-layer (SFT) structure or a Contacted Freestanding Triboelectric-layer (CFT) structure.

11. The power management circuit of claim 10,
    wherein the triboelectric nanogenerator in the Vertical Contact Separation (CS) mode comprises the two relative moving components,
    wherein a first component of the two relative moving components comprises a triboelectric layer and a first electrode layer arranged on the triboelectric layer, and a second component of the two relative moving components comprises a second electrode layer,
    wherein when the first component and the second component move relative to each other by vertically contacting with and separating from each other, the second electrode layer, is configured to act as another triboelectric layer, is contacted with the triboelectric layer, and is separated from the triboelectric layer,
    wherein the triboelectric layer comprises a material different from that of the second electrode layer,
    wherein the first electrode layer and the second electrode layer are connected to the pulse current control switch, and
    wherein when mutual separation of the triboelectric layer and the second electrode layer results in a maximal potential difference between the first electrode layer and the second electrode layer, the pulse current control switch is closed, and the transient pulse current is output between the first electrode layer and the second electrode layer to the intermediate energy storage element.

12. The power management circuit of claim 11, wherein there is a triboelectric electrode sequence difference between the material of the triboelectric layer and the material of the another triboelectric layer.

13. The power management circuit of claim 10,
    wherein the triboelectric nanogenerator in the Lateral Sliding (LS) mode comprises the two relative moving components,
    wherein a first component of the two relative moving components comprises a triboelectric layer and a first electrode layer arranged on the triboelectric layer, and a second component of the two relative moving components comprises a second electrode layer, wherein when the first component and the second component laterally slide relative to each other, the second electrode layer is configured to act as another triboelectric layer and performs mutual sliding friction with the triboelectric layer, wherein the triboelectric layer comprises a material different from that of the second electrode layer, wherein the first electrode layer and the second electrode layer are output terminals of the triboelectric nanogenerator and connected to the pulse current control switch, and wherein when the mutual sliding friction and malposition between the triboelectric layer and the second electrode layer results in a maximal potential difference between the first electrode layer and the second electrode layer, the pulse current control switch is closed, and the transient pulse current is output between the first electrode layer and the second electrode layer to the intermediate energy storage element.

14. The power management circuit of claim 10,
wherein the triboelectric nanogenerator in the Single Electrode Contact (SEC) structure comprises the two relative moving components, wherein a first component of the two relative moving components comprises a triboelectric layer, and a second component of the two relative moving components comprises a first electrode layer, and a second electrode layer or an equipotential, wherein the triboelectric layer and the first electrode layer of the second component move relative to each other by vertically contacting with and separated from each other, or sliding relative to each other, wherein the triboelectric layer comprises a material different from that of the first electrode layer, wherein the first electrode layer and the second electrode layer are output terminals of the triboelectric nanogenerator and are connected to the pulse current control switch, and wherein when mutual sliding friction and malposition between the triboelectric layer and the second electrode layer results in a maximal potential difference between the first electrode layer and the second electrode layer, the pulse current control switch is closed, and the transient pulse current is output between the first electrode layer and the second electrode layer to the intermediate energy storage element.

15. The power management circuit of claim 10,
wherein the triboelectric nanogenerator in the Sliding Freestanding Triboelectric-layer (SFT) structure comprises the two relative moving components, wherein a first component of the two relative moving components comprises a triboelectric layer, and a second component of the two relative moving components comprises a first electrode layer and a second electrode layer separated from each other, wherein when the first component and the second component slide relative to each other, the triboelectric layer slides from the first electrode layer to the second electrode layer, and the first electrode layer and the second electrode layer act as another triboelectric layer, wherein the triboelectric layer comprises a material different from those of the first electrode layer and the second electrode layer, wherein the first electrode layer and the second electrode layer are connected to the pulse current control switch, and wherein when the triboelectric layer slides between the first electrode layer and the second electrode layer, resulting in a maximal potential difference between the first electrode layer and the second electrode layer, the pulse current control switch is closed, and the transient pulse current is output between the first electrode layer and the second electrode layer to the intermediate energy storage element.

16. The power management circuit of claim 10,
wherein the triboelectric nanogenerator in the Contacted Freestanding Triboelectric-layer (CFT) structure comprises the two relative moving components, wherein a first component of the two relative moving components comprises a triboelectric layer, and a second component of the two relative moving components comprises a first electrode layer and a second electrode layer separated from each other, wherein the triboelectric layer is arranged between the first electrode layer and the second electrode layer, wherein the triboelectric layer moves between the two electrode layers to be contacted with the two electrode layers respectively and separated from the two electrode layers respectively, wherein the first electrode layer or the second electrode layer acts as another triboelectric layer, wherein the triboelectric layer comprises a material different from those of the first electrode layer and the second electrode layer, wherein the first electrode layer and the second electrode layer are connected to the pulse current control switch, and wherein when the triboelectric layer moves between the two electrode layers to be contacted with the two electrode layers respectively and separated from the two electrode layers respectively, resulting in a maximal potential difference between the first electrode layer and the second electrode layer, the pulse current control switch is closed, and the transient pulse current is output between the first electrode layer and the second electrode layer to the intermediate energy storage element.

17. A power management method for a triboelectric nanogenerator, comprising:

generating, by movement of two relative moving components of the triboelectric nanogenerator, static charges induced between two electrode layers of the triboelectric nanogenerator;

connecting the two electrode layers to generate a transient pulse current, and storing electric energy of the transient pulse current in an intermediate energy storage element; and transferring the electric energy in the intermediate energy storage element to a target energy storage element, wherein connecting the two electrode layers to generate the transient pulse current comprises setting a pulse current control switch at the two relative moving components of the triboelectric nanogenerator, wherein the pulse current control switch comprises two pulse current control switches, each of which separately controls a respective one of the two electrode layers to be connected instantaneously, and wherein two ends of the intermediate energy storage element are inversely connected to the two electrode layers when respective ones of the two pulse current control switches are closed respectively.

18. The power management method of claim 17, wherein the electric energy of the transient pulse current is stored in an inductive element, wherein the electric energy in the inductive element is transferred to a capacitive element, and a diode is provided to control a direction of the transient pulse current, wherein the intermediate energy storage element comprises the inductive element, and wherein the target energy storage element comprise the capacitive element.

\* \* \* \* \*

UNITED STATES PATENT AND TRADEMARK OFFICE
CERTIFICATE OF CORRECTION

| | |
|---|---|
| PATENT NO. | : 11,342,781 B2 |
| APPLICATION NO. | : 16/499598 |
| DATED | : May 24, 2022 |
| INVENTOR(S) | : Wang et al. |

It is certified that error appears in the above-identified patent and that said Letters Patent is hereby corrected as shown below:

On the Title Page (30) Foreign Application Priority Data: Please correct "201710214174.4" to read --201710214174.1--

Signed and Sealed this
First Day of November, 2022

Katherine Kelly Vidal
*Director of the United States Patent and Trademark Office*